Sept. 3, 1946.                    C. A. CLARKE                    2,406,806
                                   RECTIFIER
                              Filed July 16, 1943              2 Sheets-Sheet 1
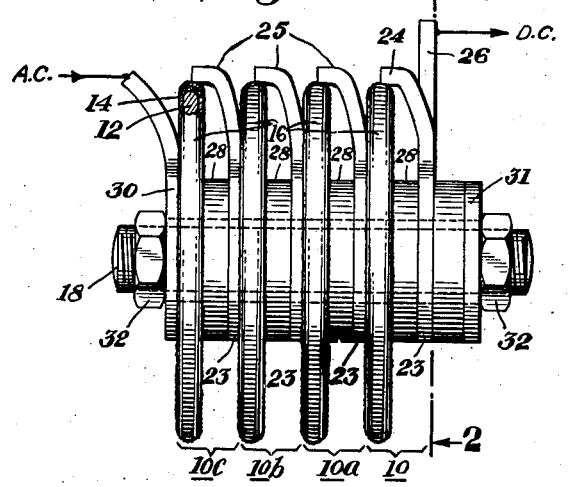
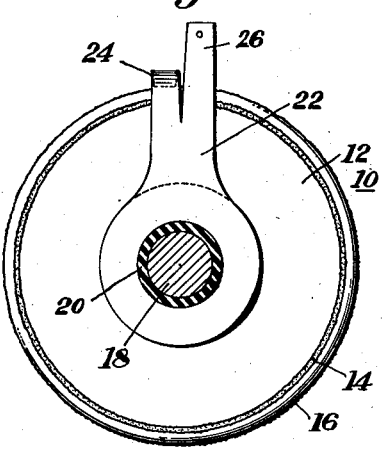
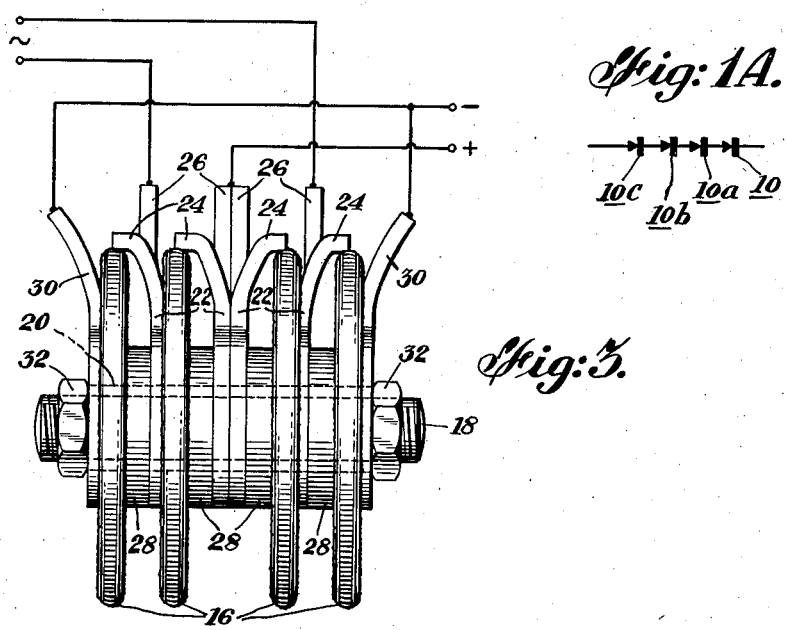
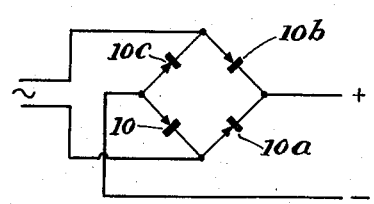
INVENTOR.
CAROLE A. CLARKE
BY
ATTORNEY Sept. 3, 1946.   C. A. CLARKE   2,406,806
RECTIFIER
Filed July 16, 1943   2 Sheets-Sheet 2
Fig: 4.
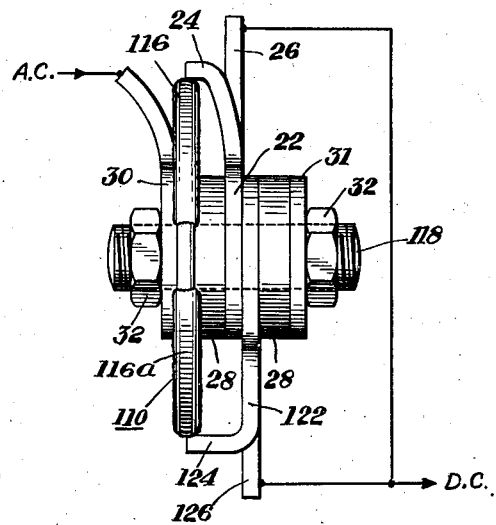
Fig: 4A.
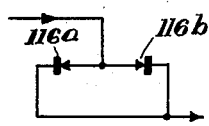
Fig: 5.
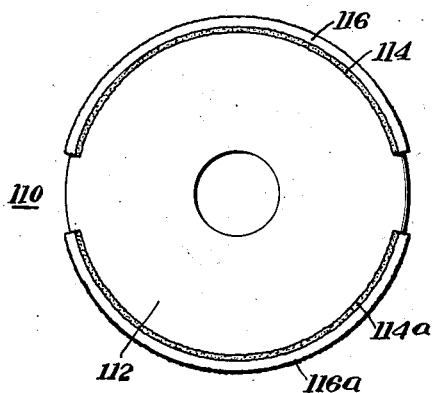
Fig: 6.
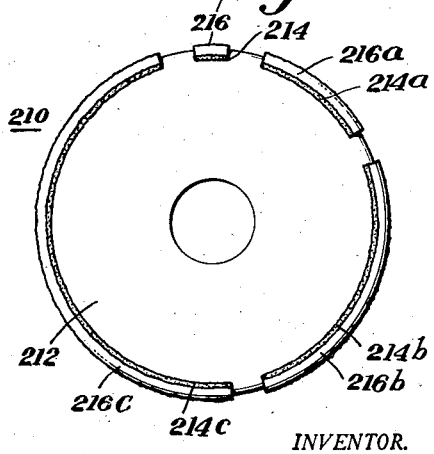
INVENTOR.
CAROLE A. CLARKE
BY
ATTORNEY Patented Sept. 3, 1946

2,406,806

UNITED STATES PATENT OFFICE 2,406,806

RECTIFIER

Carole A. Clarke, Glen Ridge, N. J., assignor to Federal Telephone and Radio Corporation, Newark, N. J., a corporation of Delaware Application July 16, 1943, Serial No. 494,913

11 Claims. (Cl. 175—366)

This invention relates to improvements in rectifiers, and more particularly to dry rectifiers of the selenium type.

An object of this invention is to provide a simple rectifier structure which readily lends itself to the assembly of various built-up units, and is particularly adapted for the efficient rectification of small currents.

Another object of this invention is directed to the provision of a novel full-wave selenium rectifier unit.

A further object of this invention is to provide a novel selenium bridge rectifier assembly.

A still further object of this invention is to provide a selenium rectifier assembly utilizing one or more metal disks having the selenium and the counter-electrode alloy on their periphery.

An additional object of this invention is to provide a full-wave selenium rectifier unit from a single metal disk having two spaced rectifier portions on its periphery.

Still another object of this invention is to provide an adjustable rectifier of one or more rotatably adjustable disks each having individual equal or unequal selenium and counter-electrode alloy sections arcuately spaced about their periphery.

Further objects and advantages of this invention will be apparent from consideration of the specification as illustrated by the accompanying drawings of embodiments of the invention, in which drawings:

Fig. 1 is a side elevation view of a rectifier assembly embodying a plurality of my novel rectifying units;

Fig. 1A is a circuit diagram of the rectifier assembly illustrated in Fig. 1;

Fig. 2 is a cross-sectional view taken along the line 2—2 of Fig. 1;

Fig. 3 is a side elevation view illustrating four of my rectifier units assembled as a full-wave bridge rectifier;

Fig. 3A is a circuit diagram of the rectifier assembly shown in Fig. 3;

Fig. 4 is a side elevation view of a full-wave rectifier embodying a modified form of rectifier disk.

Fig. 4A is a circuit diagram of the rectifier assembly illustrated in Fig. 4;

Fig. 5 is a plan view of the rectifier disk shown in Fig. 4;

Fig. 6 is a plan view of still another form of rectifier disk in accordance with the present invention.

Figs. 1 and 2 illustrate the manner in which a plurality of rectifying units in accordance with the present invention may be built up into a series rectifier circuit of the type illustrated in Fig. 1A. In the assembly given by way of example, there are four rectifiers 10, 10a, 10b, and 10c, each of which is formed essentially of a metal disk 12 about whose periphery is applied, in any suitable manner known to the art, a layer of selenium 14, on top of which is sprayed or otherwise applied a counter-electrode alloy 16. These metal disks are supported upon a mounting shaft 18 which is preferably covered with an insulating sleeve 20. A contactor 22 also mounted upon the insulated shaft 18 is formed with a longitudinally extending arm 24 readily spaced so as to bear upon the periphery of the rectifier disk and, more specifically, upon a small portion of the counter-electrode alloy 16. The contactor 22 for the rectifier unit 10 may also be formed with a tab 26 for the purpose of making connection to the rectifier assembly, the remaining contactors 23 being each formed with a contact arm 25, without, however, having the lead-forming tab 26. The face of each contactor is spaced from the metal disk upon which its contact arm bears by suitable means such as insulating washer 28, also mounted upon the insulating shaft 18. When several rectifier units are mounted upon the shaft in series relationship, one face of the contactor may, however, be adjacent to and in electrical contact with the face of the metal disk of the next succeeding rectifier unit. Thus, as seen in Fig. 1 in which the rectifier assembly is built up of four units, units 10, 10a, 10b and 10c will each consist of a rectifier disk 12 and contactor 23 spaced therefrom by insulating washer 28; the contactor of rectifier unit 10c will contact the metal disk 12 of unit 10b, the contactor of unit 10b will contact the disk of unit 10a, etc. The entire assembly may be built up in this fashion until the final rectifier unit will have the contactor 22 provided not only with a contact arm 24 but also a lead tab 26. The first rectifier unit may, in addition, have a lead washer 30 contacting the face of its disk so that, in this case, alternating current will be supplied to the lead washer 30 and direct current will be derived from the tab 26. The final contactor 22 will be held on the shaft through another insulating washer 28 and a small metal washer 31, nuts 32 on either end of the shaft 18 which may be threaded at its outer ends, tightening the whole assembly upon the shaft.

It will be evident to those skilled in this art that a rectifier of the type just described will be particularly adapted for use in rectifying small currents. As is known, the efficiency of selenium type rectifiers increases with current density and by placing the selenium and counter-electrode alloy upon the periphery of a metal disk, thereby providing a relatively narrow contact area, and utilizing a small contact arm bearing against the covered periphery, high current density and improved rectifying properties can thus be obtained. At the same time a unitary and easily assembled rectifier construction is obtained and this arrangement permits the manufacture of relatively simple parts which can be built up into various sized rectifiers, as desired. A further advantage of the assembly illustrated in Fig. 1 lies in the fact that the metal disks may, before tightening of the assembly nuts, be rotated upon the insulating shaft so that if a portion of the covered periphery shows poor rectifying qualities under test, due to local imperfections in applying the selenium and counter-electrode alloy, the disk may be rotated until a good rectifying section of the same is in contact with the contact arm.

The manner in which the rectifying units in accordance with the present invention can be adapted for various applications is illustrated in Fig. 3 showing the same four rectifying units of Fig. 1 assembled as a full-wave rectifier. In this case it is desirable that all of the contactors be of the type having an extending contact lug 26, and the position of two of the units is reversed. Thus, it will be seen in Fig. 3 that the center portion of the rectifier assembly is made up of two contactors 22 adjacent to one another and electrically interconnected. The contact arms of these two contacts extend in opposite longitudinal directions and bear against the periphery of two spaced metal disks having one face in contact with second oppositely connected contactors 22 which, respectively bear against the periphery of a pair of outer metal disks. The latter are contacted by a pair of outer lead washers 30 and the whole assembly mounted upon an insulated mounting shaft 18 in the manner previously described in connection with Fig. 1. It will be seen that if alternating current is connected across the two spaced connector lugs 26, direct current may be derived from the two center, adjacent connector lugs 26, on the one hand, and from the two outer connecting washers 30 on the other hand, resulting in a rectifier bridge having the circuit illustarted in Fig. 3A. The two outer connecting washers 30 may be externally interconnected with one another, or connection may be made through the supporting shaft 18, since, in this case, the tightening nuts 32 will bear directly upon opposite ends of this metal shaft and against the washers 30.

It is also possible, in accordance with the present invention, by forming two opposite and equal arcuately spaced peripheral rectifying sections upon a single disk to form a full-wave rectifying unit from a single disk. An example of such an arrangement is illustrated in Fig. 4, the particular disk used being shown in Fig. 5. As will be clear from the latter figure, the metal disk 112 has one portion of its periphery covered with a selenium layer 114 and a counter-electrode alloy 116, while the opposite portion of the disk is formed with an equal selenium layer 114a covered by counter-electrode alloy 116a. If this disk 112 is mounted upon an insulated shaft 118 in the manner shown in Fig. 4, a first contactor 22 may be also mounted on this shaft spaced from the disk 112 by insulating washer 28 and having its contact arm 24 bearing upon the counter electrode-alloy 116. A second contactor 122 adjacent and in contact with the contactor 22 will have a contact arm 124 bearing against the counter-electrode alloy 116a. The whole unit may be tightened upon the shaft 118 by a further insulating washer 28, an end washer 31 and a lead washer 30, as by tightening nuts 32. One or both of the connectors 22 and 122 will preferably be formed with extending connector lugs 26 and 126 respectively, serving as a direct current output terminal for the rectifier unit, alternating current being supplied to the face of the disk through connecting washer 30. The equivalent rectifier circuit is illustrated in Fig. 4A.

It is also possible in accordance with the present invention, whether the rectifier be formed as a series rectifier assembly as shown in Fig. 1A or bridge rectifier as shown in Fig. 3, to divide each metal disk into several arcuately spaced peripheral rectifying sections of different current-carrying capacities. In Fig. 6, for example, I have illustrated a disk having four different rectifying sections. For example, the small section having selenium coating 214 and counter-electrode alloy 216 may be designed to conduct one milliampere; the next larger section having selenium coating 214a and counter-electrode alloy 216a may be designed to carry five milliamperes; the next larger rectifying section having selenium coating 214b and counter-electrode alloy 216b may be designed to carry ten milliamperes, while the largest rectifying section having selenium coating 214c and counter-electrode alloy 216c may be designed to carry twenty milliamperes. Thus, by merely rotating the metal disk 212 to place various peripheral sections in contact with the contact arm, rectifying units of different adjustable capacities can be formed from a single disk or sets of disks.

Changes and modifications in the structural arrangement of the rectifier units in accordance with the present invention may be made by those skilled in this art without departing from the scope of the present invention. For example, instead of utilizing a metal assembly shaft insulated by a separate sleeve, the shaft itself might be made of insulating material. The exact construction of the contactors and their contact arms may be changed and other similar details of construction may be modified to suit design requirements and preferred methods of assembly. The diameter and thickness of the disks is intended to be relatively small, the size having been exaggerated for the sake of clarity, since the form of construction is particularly adapted to the rectification of small currents, for example, in supplying direct current to indicating instruments. However, the principles of the present invention are in general applicable to rectifiers of various sizes without specific limits.

Accordingly, while I have described above the principles of my invention in connection with specific apparatus and particular modifications thereof, it is to be clearly understood that this description is made only by way of example and not as a limitation on the scope of my invention as set forth in the objects and the accompanying claims.

I claim:

1. A rectifier comprising a relatively thin metal disk having an inner exposed contact area, a layer of selenium upon the periphery of said disk, a counter-electrode alloy on the selenium, and a contact arm bearing against the alloy.

2. A rectifier as set forth in claim 1, in combination with an insulator intermediate said disk and said contact arm, and means for clamping said disk, insulator and contact arm together in a unitary structure.

3. A rectifier comprising a plurality of relatively thin metal disks, each having a layer of selenium on its periphery and a counter-electrode alloy on the selenium, a plurality of insulating washers, a plurality of metal contactors each having a longitudinally extending arm adapted to contact the alloy on the periphery of a disk, and means for assembling said disks, washers and contactors into a rectifier assembly, comprising a central insulated shaft upon which said parts are assembled with each contactor spaced from the disk whose periphery it contacts by one of said washers and positioned adjacent to and in contact with the face of the next succeeding disk, and means for tightening said parts upon said shaft.

4. A rectifier comprising a plurality of stacked units mounted on a common central support, each unit comprising a metal plate having a layer of selenium on its periphery and a counter-electrode alloy on the selenium, a contactor having a contact arm bearing on the peripheral counter-electrode alloy, and an insulating spacer intermediate said metal disk and said contactor, said units being stacked with the face of the metal disk of one unit being adjacent to and in electrical contact with the face of the contactor of the preceding unit, and means for tightening said units upon said common central support.

5. A full-wave rectifier unit comprising, in combination, four relatively thin metal disks, each having a layer of selenium on its periphery and a counter-electrode alloy on the selenium, four insulators and four contactors each having a radial and longitudinally extending arm adapted to contact the alloy on the periphery of a disk, and a common insulated mounting shaft for said parts, said parts being mounted on said shaft with one disk at one end and a contactor having an arm bearing on the alloy of said one disk spaced from the disk by one of said insulators, a second disk lying against the one contactor and having its face in electrical contact therewith, a second insulator between said second disk and said second contactor having an arm bearing on the alloy of the second disk, a third contactor adjacent to and in contact with said second contactor, with its contact arm extending longitudinally opposite to the arms of the first and second contactors, and a third insulator spacing the third disk from said third contactor with the arm of the latter in contact with the periphery of the third disk, a fourth contactor lying against and in contact with the face of the third disk, a fourth insulator separating the fourth contactor from the fourth disk, said fourth contactor having its contact arm bridging its fourth insulator and contacting the periphery of said fourth disk, and means for holding said parts on said shaft in the order set forth.

6. The combination according to claim 5, in combination with means electrically interconnecting the two faces of the end disks.

7. A rectifier comprising, in combination, a metal disk having its periphery covered by two opposite arcuately spaced substantially equal layers of selenium, counter-electrode alloy on each selenium layer, an insulated mounting stud for said disk, an insulating spacer on said stud adjacent said disk, a contactor having a longitudinally extending contact arm bearing on the counter electrode alloy of one of said layers, mounted on said stud adjacent said spacer, a second contactor having a longitudinally extending contact arm bearing on the counter-electrode alloy of the other of said layers, mounted on said stud adjacent the first contactor, and means holding all of said parts on said stud.

8. A metal contact rectifier comprising a plurality of rectifier discs, means for mounting the discs in a stack including means for insulating the elements from each other, each disc including a peripheral layer of selenium spaced from an inner contact area, and a counter-electrode on said layer; and a connector extending between and contacting the inner contact area of one disc and the peripheral counter-electrode of another disc.

9. A metal contact rectifier comprising a plurality of rectifier discs each including a peripheral layer of selenium spaced from an inner contact area, and a counter-electrode on said layer; a mounting shaft extending through the discs, means for insulating the discs from the shaft and from each other, means for applying endwise clamping pressure to the discs on the shaft, and a metal connecting member having an inner end held by said clamping means against the contact area of one disc and having an outwardly extending portion contacting the peripheral counter-electrode of another disc.

10. A rectifier element comprising a relatively thin metal disc, a layer of selenium upon the periphery of said disc, divided into two separate sections covering substantially equal and opposite portions of the periphery, and separate portions of counter-electrode alloy covering each selenium layer.

11. A rectifier element comprising a relatively thin metal disc, a layer of selenium upon the periphery of said disc, divided into a plurality of spaced sections of different lengths, and separate portions of counter-electrode alloy covering each selenium layer.

CAROLE A. CLARKE.